United States Patent [19]

Durst

[11] Patent Number: 5,524,993
[45] Date of Patent: Jun. 11, 1996

[54] AUTOMATIC PRINT SPEED CONTROL FOR A BARCODE PRINTER

[75] Inventor: William B. Durst, Lebanon, Ohio

[73] Assignee: Monarch Marking Systems, Inc., Dayton, Ohio

[21] Appl. No.: 132,656

[22] Filed: Oct. 6, 1993

[51] Int. Cl.[6] ................................................ B41J 2/355
[52] U.S. Cl. ........................... 400/279; 400/54; 400/582; 400/120.14; 347/14; 347/17
[58] Field of Search ................................ 400/54, 103, 120, 400/303, 313, 317, 319, 323, 582, 583, 583.4.61, 62, 120.01, 120.05, 120.06, 120.07, 120.08, 120.09, 120.10, 120.11, 120.12, 120.14, 124.03, 124.07, 124.13, 279; 346/76 PH; 347/14, 17, 19

[56] References Cited

U.S. PATENT DOCUMENTS

| | | |
|---|---|---|
| 4,440,248 | 4/1984 | Teraoka . |
| 4,630,067 | 12/1986 | Teraoka . |
| 4,679,053 | 7/1987 | Katsurai et al. ........................... 346/1.1 |
| 4,714,363 | 12/1987 | Minowa .............................. 400/120.12 |
| 4,734,710 | 3/1988 | Sazo et al. ................................ 400/103 |
| 4,877,344 | 10/1989 | Watahiki et al. .......................... 400/54 |
| 5,056,043 | 10/1991 | Hawkes .............................. 364/76 PH |
| 5,109,234 | 4/1992 | Otis, Jr. et al. ........................... 346/1.1 |
| 5,152,619 | 10/1992 | Niikawa et al. .......................... 400/54 |
| 5,182,583 | 1/1993 | Horigome et al. ....................... 400/54 |
| 5,184,150 | 2/1993 | Sugimoto ............................... 347/196 |
| 5,191,356 | 3/1993 | Shibamiya ............................. 400/120 |
| 5,267,800 | 12/1993 | Petteruti et al. ........................ 400/120 |
| 5,307,093 | 4/1994 | Suzuki et al. ............................. 400/54 |

FOREIGN PATENT DOCUMENTS

| | | |
|---|---|---|
| 0255116B1 | 6/1994 | European Pat. Off. . |
| 2138190 | 4/1984 | United Kingdom . |
| 2228450 | 1/1990 | United Kingdom . |

*Primary Examiner*—John S. Hilten
*Attorney, Agent, or Firm*—McAndrews, Held & Malloy, Ltd.

[57] ABSTRACT

An automatic print speed control for a barcode printer is shown, the printer includes a printhead to which power is applied during a strobe time to cause the printhead to print. The printer also includes a stepper motor that is responsive to a periodic drive signal for advancing a web of labels or the like past the printhead for printing thereon. The control is responsive to a number of measured operating variables of the barcode printer to adjust the printhead strobe time. The adjusted strobe time is compared to the period of the stepper motor drive signal in order to adjust the speed of the stepper motor if necessary.

46 Claims, 2 Drawing Sheets

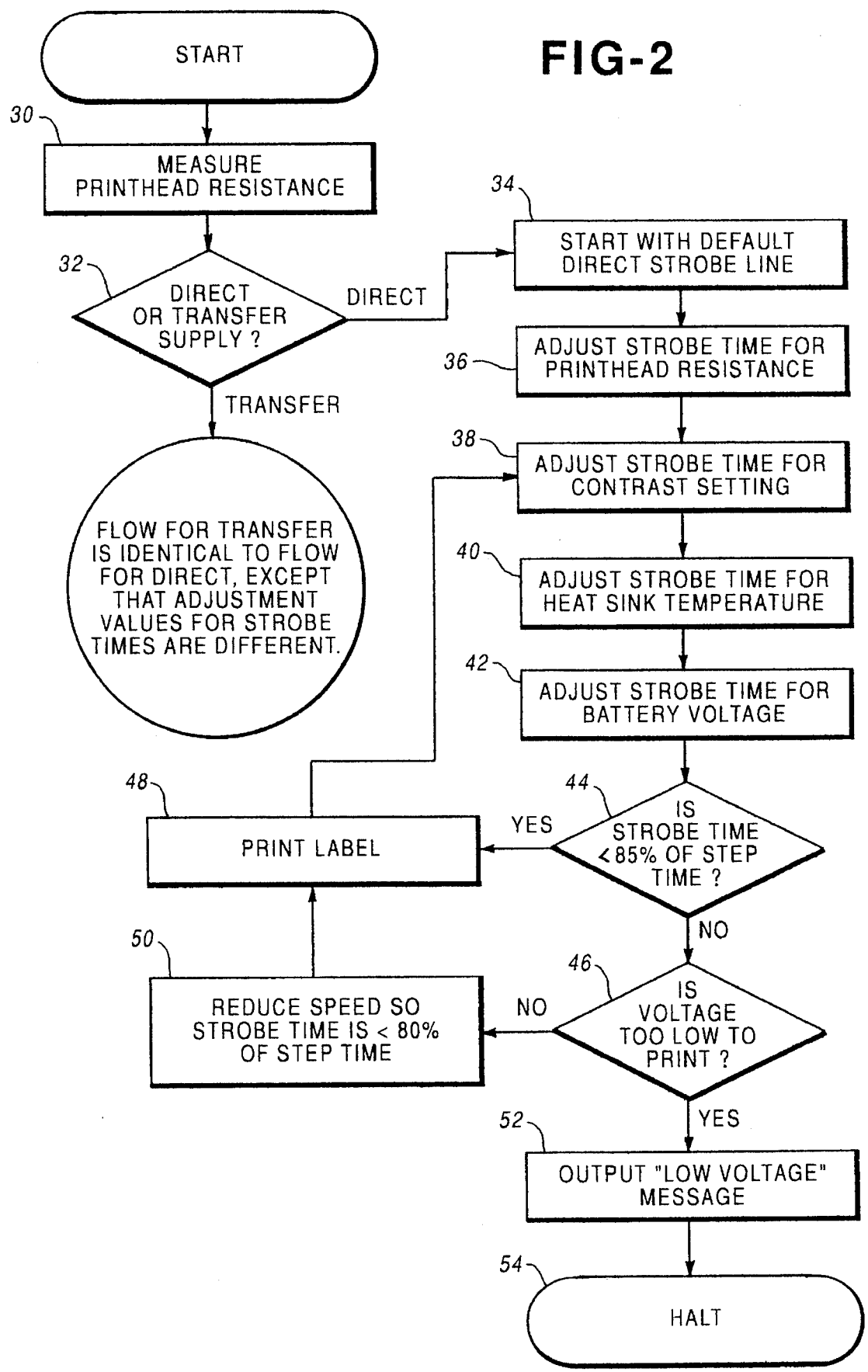

AUTOMATIC PRINT SPEED CONTROL FOR A BARCODE PRINTER

TECHNICAL FIELD

The present invention is directed to an automatic print speed control and method for a battery powered, barcode printer that prints on tags, labels, and the like; and more particularly to such a control that varies the strobe time for the printhead of the barcode printer based on a number of measured operating variables and that adjusts the print speed based upon the adjusted printhead strobe time.

BACKGROUND OF THE INVENTION

Known barcode printers that are battery powered are typically designed for worse case operating conditions including low battery voltage, high printhead resistance, low printhead temperature, etc. In particular, these known barcode printers operate at one print speed under all operating conditions where the print speed is selected so that the printer will adequately print under the worse case operating conditions. Such barcode printers have low throughput, as well as short battery operating cycles.

SUMMARY OF THE INVENTION

In accordance with the present invention, the disadvantages of prior battery powered barcode printers have been overcome. The barcode printer of the present invention automatically adjusts the print speed based on a number of measured operating variables without utilizing, or minimizing the need to utilize, lookup tables. Because the control of the present invention does not utilize multiple layers of nested lookup tables, the control requires a minimum amount of memory; is easier to program into software; and is easier to modify.

More particularly, the barcode printer of the present invention includes a printhead to which power is applied during a strobe time to cause the printhead to print. The barcode printer also includes a stepper motor that is responsive to a periodic drive signal for advancing a web of record members such as tags, labels or the like past the printhead for printing on the record members. The automatic print speed control measures a number of operating variables of the barcode printer. In response to a plurality of those measured operating variables, the control adjusts the printhead strobe time for printing. Thereafter, the control compares the adjusted printhead strobe time to the period of the stepper motor drive signal so as to adjust the speed of the stepper motor if needed.

In order to adjust the printhead strobe time, the control of the barcode printer of the present invention includes a memory for storing information representing a linear equation for each of a number of measured operating variables, wherein each equation defines how the strobe time is linearly related to the respective operating variable. The control varies the strobe time according to each of a plurality of the linear equations in response to each of a plurality of respective measured operating variables. In order to determine if the speed of the stepper motor needs to be reduced, the control compares the adjusted printhead strobe time to the period of the stepper motor drive signal. If the adjusted strobe time is greater than or equal to a percentage of the period of the stepper motor drive signal, the speed of the stepper motor is reduced. It is noted that the strobe time of the printhead may be adjusted prior to printing on a record member and/or during the printing on a record member.

These and other objects, advantages, and novel features of the present invention, as well as details of an illustrated embodiment thereof, will be more fully understood from the following description and from the drawing.

BRIEF DESCRIPTION OF THE DRAWING

FIG. 2 is a flow chart illustrating an automatic print speed control software routine for implementation by the barcode printer depicted in FIG. 1.

DESCRIPTION OF THE PREFERRED EMBODIMENT

Figure 1:
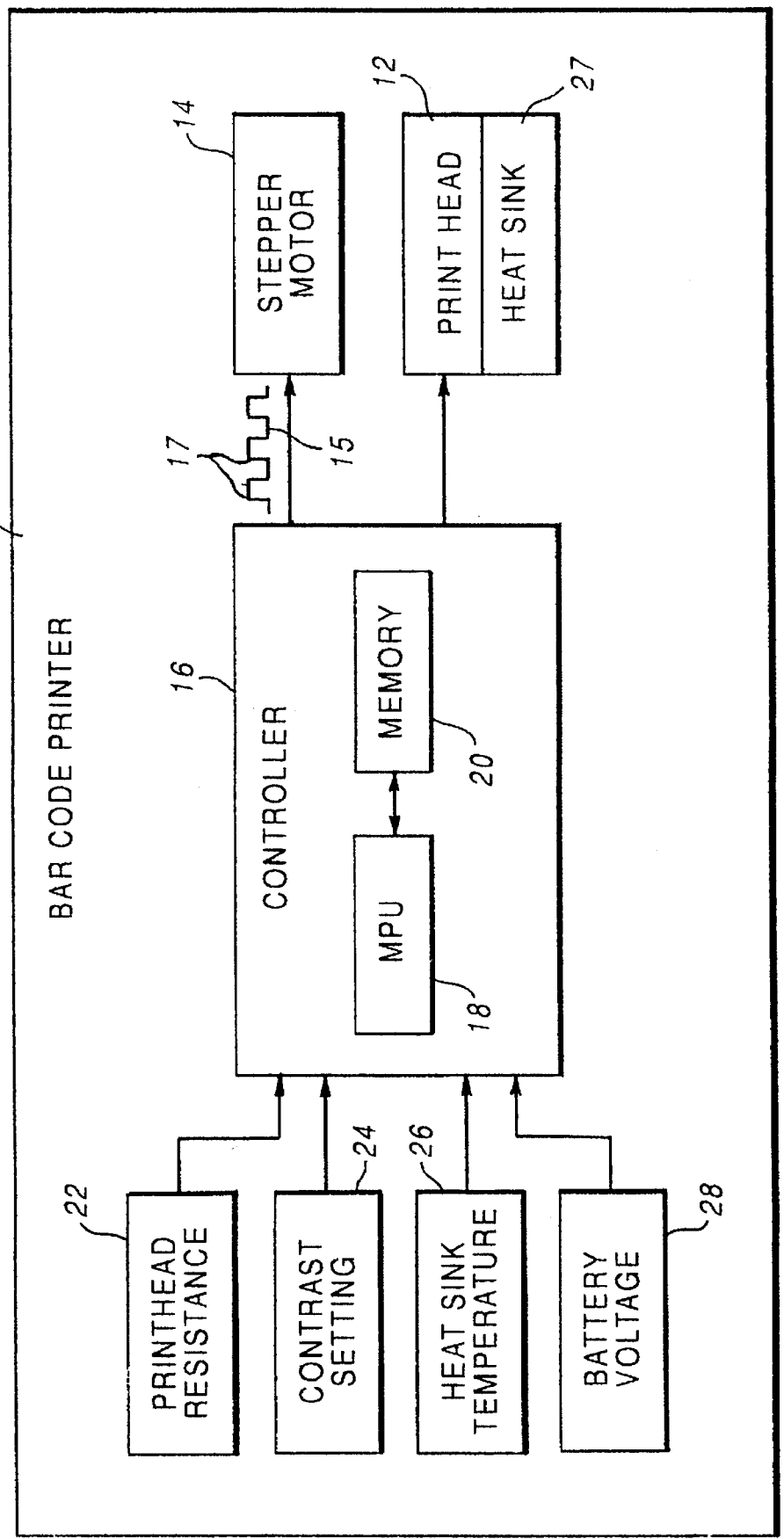
FIG. 1 is a block diagram of a barcode printer with the automatic print speed control of the present invention.

A barcode printer 10 in accordance with the present invention and as shown in FIG. 1 includes a thermal printhead 12 for printing barcodes and alphanumeric information on a web of record members such as tags, labels or the like. The supply of the web of record members may be of the direct printing type such that the record members include paper coated with a thermally responsive material. Alternatively, the supply used with the barcode printer 10 may be of the transfer type wherein a carbon ribbon is heat activated by the printhead 12 so as to print on the record members. The printhead 12 is strobed to control the amount of energy applied thereto for printing. More particularly, current is applied to the printhead 12 during a strobe time in order to print one line on a record member.

The barcode printer 10 also includes a stepper motor 14 or the like that is responsive to a periodic drive signal 15, the period 17 of which is defined by the time between the leading edges of consecutive or adjacent pulses of the drive signal. The stepper motor 14 is responsive to the drive signal 15 to advance the web of record members past the printhead 12 for printing. The drive signal 15 controls the speed of the stepper motor 14 which in turn controls the print speed of the barcode printer 10.

A controller 16 includes a microprocessor 18 or the like which operates in accordance with software routines stored in a memory 20 so as to control the operations of the barcode printer 10. In order to automatically control the strobe time of the printhead 12 and the print speed of the printer 10, the microprocessor 18 operates in accordance with the automatic print speed control subroutine depicted in FIG. 2. A number of sensors, monitors, detectors or the like such as depicted at 22, 24, 26, and 28, monitor operating conditions of the barcode printer 10 including the resistance of the printhead 12, the contrast setting of the barcode printer, the temperature of a heat sink 27 on which the printhead 12 is mounted and the voltage of a battery powering the barcode printer 10. The measured values of the printhead resistance, contrast setting, heat sink temperature, battery voltage, as well as other operating variables if desired, are utilized by the microprocessor 18 when implementing the automatic print speed control routine described below.

As shown in FIG. 2, when power for the barcode printer 10 is turned on, the microprocessor 18, when implementing the automatic print speed control, measures the resistance of the printhead 12 at a block 30. Thereafter, the microprocessor 18 determines at block 32 whether the supply being used with the printer 10 is of the direct type or transfer type of supply. If the supply is of the direct type, the microprocessor 18 proceeds to block 34 from block 32. At block 34, the microprocessor 18 sets the strobe time of the printhead 12 to a default setting which may be, for example, 2020 microseconds. Thereafter, the microprocessor 18 adjusts the strobe time value set at block 34 for the printhead resistance measured at block 30.

More particularly, at block 36, the microprocessor 18 determines the difference between the measured resistance and a reference resistance value, which may be, for example, 355 Ohms. This difference is positive for measured resistance values that are greater than the reference printhead resistance value and the difference is negative for measured resistance values that are less than the reference printhead resistance value. The difference value is multiplied by a printhead resistance scaling factor, such as 4.90 microseconds/Ohms, to provide a printhead resistance offset which is added at block 36 to the strobe time value set at block 34 so as to adjust the strobe time for the measured resistance of the printhead 12.

From block 36, the microprocessor 18 proceeds to block 38 to adjust the strobe time value determined at block 36 for the setting of the printing contrast. More particularly, at block 38, the microprocessor 18 determines the difference between the measured contrast setting and a reference value for the contrast setting and multiplies this difference by a linear scaling factor of, for example, 20 microseconds/unit so as to provide an offset for the contrast setting which is added to the strobe time value. When the measured contrast setting is higher than the reference contrast setting, the offset is positive so as to increase the strobe time of the printhead. Whereas, when the measured contrast setting is lower than the reference contrast setting, the offset calculated at block 38 is negative so as to decrease the strobe time value.

From block 38, the microprocessor proceeds to block 40 so as to adjust the strobe time value based upon the measured temperature of the heat sink 27 of the printhead 12. More particularly, at block 40, the microprocessor 18 determines the difference between the measured heat sink temperature and a reference heat sink temperature, which may, for example, be on the order of 30° C. This difference is multiplied by a linear scaling factor that is negative, such as −17.6 microseconds/° C. so as to provide the offset to the strobe time for the measured heat sink temperature variable. Measured heat sink temperatures that are higher than the reference temperature result in a reduced strobe time value; whereas, measured temperatures that are lower than the reference temperature result in an increased strobe time value. The adjustment to the strobe time for the measured heat sink temperature may be made once for the printing of a given record member such as a label or alternatively, the adjustment may be made several times during the printing of one record member.

The microprocessor 18 proceeds from block 40 to block 42 to adjust the strobe time value in accordance with the measured voltage of the battery that powers the barcode printer 10. More particularly, at block 42 the microprocessor 18 determines the difference between the measured battery voltage and a reference voltage of, for example, 12.75 volts and multiplies this difference by a negative scaling factor of, for example, −311 microseconds/volt so as to provide an offset for the battery voltage which is added to the printer strobe time. If the measured battery voltage is greater than the reference voltage, the microprocessor 18 decreases the printhead strobe time; whereas if the measured battery voltage is less than the reference battery voltage the microprocessor increases the strobe time. The adjustment of the printhead strobe time based upon battery voltage may be made once per record member, every few lines of the record member or for every line of printing on the record member as desired.

Before the printing operation begins, the microprocessor 18 determines at block 44 whether the strobe time is greater than or equal to a given percentage of the step time or period 17 of the stepper motor 14. The percentage may be set equal to 100% or to a value less than 100%, such as 85%. If the microprocessor 18 determines at block 44 that the strobe time is less than the specified percentage of the step time of the stepper motor 14, the microprocessor proceeds to block 48. At block 48 the microprocessor 18 prints a label if the adjustments performed at blocks 38, 40, and 42 are to be made only once per record member and prior to the printing thereof. Alternatively, the microprocessor can print one line or a few lines at block 48 after which the microprocessor can dynamically adjust the strobe time at any one or all of the blocks 38, 40, and 42 so as to adjust the printhead strobe time during the printing of a record member. If the microprocessor determines at block 44 that the strobe time is not less than the given percentage of the stepper motors step time, the microprocessor 18 proceeds to block 46. At block 46 the microprocessor 18 determines whether the measured voltage of the battery powering the barcode printer 10 is too low to print. For example, if the battery voltage is lower than 9–12 volts, the microprocessor 18 may determine that the battery voltage is too low to print. If the battery voltage is too low to print, the microprocessor proceeds from block 46 to block 52 to output a low voltage message 52 on a display or indicator of the barcode printer 10. Thereafter, the microprocessor halts the operation of the barcode printer 10. If, however, the measured battery voltage is not too low to print, the microprocessor 18 proceeds from block 46 to block 50. At block 50 the microprocessor 18 reduces the print speed by reducing the speed of the stepper motor 14 so that the step time of the stepper motor is lengthened. In particular the microprocessor 18 lengthens the step time i.e., period of the stepper motor so that the printhead strobe time is less than a given percentage, such as 80%, of the stepper motor step time.

If the microprocessor 18 determines at block 32 that the supply is a transfer type of supply, the microprocessor implements steps that are the same as steps 34–54 described above, but uses different default values and scaling factors. For example, with a transfer type of supply the default strobe time might be on the order of 1350 microseconds with a printhead resistance multiplier of 3.35 microseconds/Ohm, a heat sink temperature scaling factor of −9.86 microseconds/° C., a contrast scaling factor of 20 microseconds/unit, and a battery voltage scaling factor of −211 microseconds/volt.

It is noted that the linear relationships described above between strobe time and each of the printer operating variables, such as printhead resistance, contrast setting, heat sink temperature and battery voltage may not necessarily be linear in general. However, it has been found that the relationships are substantially linear over a range that is encountered during the operation of the barcode printer 10. Therefore, linear relationships as described above can be used to adjust the printhead strobe time based upon these operating variables. Because the control of the present invention utilizes equations or algorithms as opposed to lookup tables in order to modify the strobe time of the printhead, a minimal amount of memory is necessary to implement the control of the present invention while still taking into account a large number of measured operating variables. Further, testing and modification of the control of the present invention is made easier.

It is further noted that the present invention is not limited for use with a barcode printer having a stepper motor. For example, if a different type of motor is used, the adjusted strobe time can be compared to the time that it takes the motor to move the supply through the printing of one line of dots in order to determine whether the print speed should be reduced or not.

Many modifications and variations of the present invention are possible in light of the above teachings. Thus, it is to be understood, that within the scope of the appended claims the invention may be practiced otherwise than as described hereinabove.

What is claimed and desired to be secured by Letters Patent is:

1. An automatic print speed control for a barcode printer that prints on a web of record members having a printhead to which power is applied during a strobe time to cause said printhead to print and having an adjustable speed stepper motor responsive to a periodic drive signal for advancing said web past said printhead for printing comprising:

means for measuring a plurality of operating variables of said barcode printer to provide a plurality of measured variables;

adjustment means responsive to a plurality of said operating variables for adjusting said printhead strobe time to provide an adjusted strobe time; and means for comparing said adjusted strobe time to the period of said stepper motor drive signal to adjust the speed of said stepper motor if said adjusted strobe time is within a given range of said period.

2. An automatic print speed control for a barcode printer as recited in claim 1 wherein said adjustment means includes means for generating for one of said measured variables an offset value to be added to a strobe time value, said offset generating means determining the difference between a measured value and a reference value for said one variable and applying a linear relationship to said difference value to generate the offset value for said one variable.

3. An automatic print speed control for a barcode printer as recited in claim 1 wherein said adjustment means includes offset generating means for generating for each of said measured variables an offset value to be added to a strobe time value, said offset generating means determining the difference between a measured value and a respective reference value for a given variable and applying a linear relationship to said difference value to generate the offset value for said given variable.

4. An automatic print speed control for a barcode printer as recited in claim 1 wherein one of said operating variables includes the resistance of said printhead.

5. An automatic print speed control for a barcode printer as recited in claim 1 wherein said barcode printer includes means for setting a print contrast and one of said operating variables includes said contrast setting.

6. An automatic print speed control for a barcode printer as recited in claim 1 wherein said printhead includes a heat sink and one of said operating variables includes the temperature of said heat sink.

7. An automatic print speed control for a barcode printer as recited in claim 1 wherein said printer is battery powered and one of said variables includes the power level of said battery.

8. An automatic print speed control for a barcode printer as recited in claim 1 wherein said strobe time adjusting means adjusts said strobe time prior to printing on each record member.

9. An automatic print speed control for a barcode printer as recited in claim 1 wherein said strobe time adjusting means adjusts said strobe time based on at least one of said measured variables during the printing on a record member.

10. An automatic print speed control for a portable, battery powered barcode printer that prints on a web of record members having a print head to which power is applied during a strobe time to cause said printhead to print and having a stepper motor responsive to a periodic drive signal for advancing said web past said printhead for printing comprising:

means for measuring a plurality of operating variables of said barcode printer;

means responsive to a plurality of said operating variables for adjusting said printhead strobe time for printing on a record member;

means for comparing said adjusted strobe time to the period of said stepper motor drive signal to determine whether said adjusted strobe time is greater than or equal to a predetermined percentage of the period of said stepper motor drive signal; and means responsive to said comparing means to reduce the speed of said stepper motor if said adjusted strobe time is greater than or equal to said percentage of the period of said stepper motor drive signal.

11. An automatic print speed control for a portable, battery powered barcode printer as recited in claim 10 wherein said adjustment means includes means for generating for one of said measured variables an offset value to be added to a strobe time value, said offset generating means determining the difference between a measured value and a reference value for said one variable and applying a linear relationship to said difference value to generate the offset value for said one variable.

12. An automatic print speed control for a portable, battery powered barcode printer as recited in claim 10 wherein said adjustment means includes means for generating for each of said measured variables an offset value to be added to a strobe time value, said offset generating means determining the difference between a measured value and a respective reference value for a given variable and applying a linear relationship to said difference value to generate the offset value for said given variable.

13. An automatic print speed control for a portable, battery powered barcode printer as recited in claim 10 wherein one of said operating variables includes the resistance of said printhead.

14. An automatic print speed control for a portable, battery powered barcode printer as recited in claim 10 wherein said barcode printer includes means for setting a print contrast and one of said operating variables includes said contrast setting.

15. An automatic print speed control for a portable, battery powered barcode printer as recited in claim 10 wherein said printhead includes a heat sink and one of said operating variables includes the temperature of said heat sink.

16. An automatic print speed control for a portable, barcode printer as recited in claim 10 wherein said printer is battery powered and one of said variables includes the power level of said battery.

17. An automatic print speed control for a portable, battery powered barcode printer as recited in claim 10 wherein said strobe time adjusting means adjusts said strobe time prior to printing on each record member.

18. An automatic print speed control for a portable, battery powered barcode printer as recited in claim 10 wherein said strobe time adjusting means adjusts said strobe time based on at least one of said measured variables during the printing on a record member.

19. An automatic print speed control for a barcode printer as recited in claim 10 wherein said percentage is 100%.

20. An automatic print speed control for a barcode printer as recited in claim 10 wherein said percentage is less than 100%.

21. An automatic printhead strobe time control for a barcode printer that prints on a web of record members having a printhead to which power is applied during a strobe time comprising:

means for measuring a plurality of operating variables of said barcode printer;

means for storing information representing a linear equation for each of a plurality of said operating variables, each of said equations defining how said strobe time is linearly related to the operating variable; and means for varying said strobe time according to each of a plurality of said linear equations in response to each of a plurality of respective measured operating variables.

22. An automatic printhead strobe time control for a barcode printer as recited in claim 21 wherein one of said operating variables includes the resistance of said printhead.

23. An automatic printhead strobe time control for a barcode printer as recited in claim 21 wherein said barcode printer includes a print contrast setting and one of said operating variables includes said print contrast setting.

24. An automatic printhead strobe time control for a barcode printer as recited in claim 21 wherein said barcode printer includes a heat sink for said printhead and one of said operating variables includes the temperature of said heat sink.

25. An automatic printhead strobe time control for a barcode printer as recited in claim 21 wherein said barcode printer is battery powered and one of said operating variables includes the power level of said battery.

26. An automatic printhead strobe time control for a barcode printer as recited in claim 21 wherein said strobe time varying means varies said strobe time prior to printing on each record member.

27. An automatic printhead strobe time control for a barcode printer as recited in claim 21 wherein said strobe time varying means varies said strobe time based on at least one measured variable during the printing on a record member.

28. An automatic print speed control for a barcode printer that prints on a web of record members having a printhead to which power is applied during a strobe time to cause said printhead to print and having a motor responsive to a drive signal for advancing said web past said printhead for printing comprising:

means for measuring a plurality of operating variables of said barcode printer;

means for storing information representing a linear equation for each of a plurality of said operating variables, each of said equations defining how said strobe time is linearly related to said respective operating variable;

means for varying said strobe time according to each of a plurality of said linear equations in response to each of a plurality of respective measured operating variables; and means for comparing said varied strobe time to a time value that varies with the speed of said motor to determine whether said motor speed should be reduced.

29. An automatic print speed control for a barcode printer as recited in claim 28 wherein said drive signal is periodic and including means responsive to said comparing means to reduce said stepper motor speed if said varied strobe time is equal to the period of said motor drive signal.

30. An automatic print speed control for a barcode printer as recited in claim 28 wherein said drive signal is periodic and including means responsive to said comparing means to reduce said stepper motor speed if said varied strobe time is greater than a predetermined percentage of the period of said motor drive signal.

31. A method for automatically controlling a printhead strobe time of a barcode printer that prints on a web of record members and includes a printhead to which power is applied during a strobe time comprising:

measuring a plurality of operating variables of said barcode printer;

storing information representing a linear equation for each of a plurality of said operating variables, each of said equations defining how said strobe time is linearly related to said respective operating variable; and varying said strobe time according to each of a plurality of said linear equations in response to each of a plurality of respective measured operating variables.

32. A method for automatically controlling the printhead strobe time of a barcode printer as recited in claim 31 wherein one of said operating variables includes printhead resistance.

33. A method for automatically controlling the printhead strobe time of a barcode printer as recited in claim 31 wherein said barcode printer includes a print contrast setting and one of said operating variables includes said print contrast setting.

34. A method for automatically controlling the printhead strobe time of a barcode printer as recited in claim 31 wherein said barcode printer includes a heat sink for said printhead and one of said operating variables includes the temperature of said heat sink.

35. A method for automatically controlling the printhead strobe time of a barcode printer as recited in claim 31 wherein said barcode printer is battery powered and one of said operating variables includes the power level of said battery.

36. A method for automatically controlling the printhead strobe time of a barcode printer as recited in claim 31 wherein said strobe time is varied prior to printing on each record member.

37. A method for automatically controlling the printhead strobe time of a barcode printer as recited in claim 31 wherein said strobe time is varied based on at least one measured variable during printing on a record member.

38. A method for automatically controlling the print speed of a barcode printer that prints on a web of record members having a printhead to which power is applied during a strobe time to cause said printhead to print and having a stepper motor responsive to a periodic drive signal for advancing said web past said printhead for printing comprising:

measuring a plurality of operating variables of said barcode printer;

storing information representing a linear equation for each of a plurality of said operating variables, said equation defining how said strobe time is linearly related to said respective operating variable;

varying said strobe time according to each of a plurality of said linear equations in response to each of a plurality of respective measured operating variables; and comparing said varied strobe time to said stepper motor drive signal to adjust the speed of said stepper motor.

39. A method for automatically controlling the print speed of a barcode printer as recited in claim 38 wherein one of said operating variables includes printhead resistance.

40. A method for automatically controlling the print speed of a barcode printer as recited in claim 38 wherein said barcode printer includes a print contrast setting and one of said operating variables includes said print contrast setting.

41. A method for automatically controlling the print speed of a barcode printer as recited in claim 38 wherein said barcode printer includes a heat sink for said printhead and one of said operating variables includes the temperature of said heat sink.

42. A method for automatically controlling the print speed of a barcode printer as recited in claim 38 wherein said barcode printer is battery powered and one of said operating variables includes the power level of said battery.

43. A method for automatically controlling the print speed of a barcode printer as recited in claim 38 wherein said strobe time is varied prior to printing on each record member.

44. A method for automatically controlling the print speed of a barcode printer as recited in claim 38 wherein said strobe time is varied based on at least one measured variable during printing on a record member.

45. A method for automatically controlling the print speed of a barcode printer as recited in claim 38 including the step of reducing said stepper motor speed if said strobe time is equal to the period of said motor drive signal.

46. A method for automatically controlling the print speed of a barcode printer as recited in claim 38 including the step of reducing said stepper motor speed if said strobe time is greater than a predetermined percentage of the period of said motor drive signal.

* * * * *